United States Patent Office 2,948,682
Patented Aug. 9, 1960

2,948,682

FORMYL TRIESTERS OF DITHIOPHOSPHORIC ACID AND LUBRICATING OIL COMPOSITIONS CONTAINING SAME

Gifford W. Crosby, River Forest, Allen F. Millikan, Crystal Lake, and Elmer W. Brennan, Dundee, Ill., assignors to The Pure Oil Company, Chicago, Ill., a corporation of Ohio No Drawing. Filed Dec. 24, 1956, Ser. No. 630,088

7 Claims. (Cl. 252—46.6)

This invention relates to the production of formylalkyl phosphate esters. It is more particularly concerned with the reaction product obtained by reacting an acid, organic, thiophosphate ester with an unsaturated aldehyde, and the incorporation of such compositions in a lubricating oil composition.

Because of the acidic characteristics of O,O-diesters of dithiophosphoric acids, these compositions have been widely used as chemical intermediates in the production of a variety of organic phosphorus compounds. The preparation of these diesters is most expeditiously carried out by the reaction of organic hydroxy compounds, especially aliphatic alcohols, with phosphorus pentasulfide, according to the following reaction:

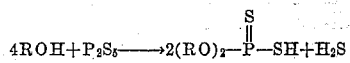

where R is alkyl, aryl, or alkylaryl. In preparing these compounds the reaction can be carried out under conditions such that mixed esters having dissimilar, organic substituent groups are formed. The hydroxy reactants are preferably saturated alcohols or aryl hydroxy compounds which can contain saturated substituent groups in order to avoid the formation of polymers or condensation products resulting from the reaction of the ester with itself. These acid diester materials react readily with metallic and organic bases to form salts. Another group of important reactants includes a number of olefinic or functionally substituted, olefinic, organic compounds, including hydrocarbons, acids, esters, alcohols, amides, etc. In U.S. Patent 2,528,732, hydrocarbons, alcohols, fatty acids, and their esters are utilized. Other reactants include maleic acid and its ester derivatives (U.S. Patent 2,578,652), unsaturated amides such as acrylamide (U.S. 2,709,156), unsaturated ketones, including methyl vinyl ketone (U.S. Patent 2,632,020), and unsaturated ethers, including vinyl butyl ether (U.S. Patent 2,565,920).

Although there is described in the prior art, U.S. Patent 2,736,737, a class of organic phosphates which are prepared by reacting phosphate partial esters with aldehydes, these compositions are described as condensation products. According to the subject invention it has been found that aldehydes can be reacted with phosphate partial esters to form products which have a carbonylic nucleus as part of the thiophosphate ester molecule.

It is therefore the primary object of this invention to provide a novel thiophosphate ester. It is another object of this invention to provide oil-soluble, formylalkyl thiophosphate esters for use as lubricating oil additives. An additional object of this invention is to provide a lubricating oil additive having minimum deposit-forming tendencies which will enhance the load-carrying and antiwear characteristics of a mineral lubricating oil. A further object of this invention is to provide a lubricating oil composition having enhanced load-carrying and antiwear characteristics.

According to this invention it has been found that a formylalkyl thiophosphate ester having the following general formula:

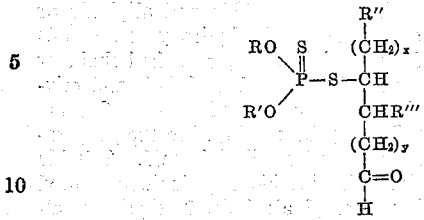

where R and R' are selected from the group consisting of saturated alkyl radicals having 2 to 20 carbon atoms, aryl and alkylaryl radicals containing from 1 to 16 carbon atoms in the saturated alkyl substituent group, R" is selected from the group consisting of hydrogen and phenyl, R''' is a substituent selected from the group consisting of hydrogen, methyl, or ethyl, and $x$ and $y$ are integers from 0 to 8, inclusive, can be prepared by reacting an O,O-diester of a dithiophosphoric acid with an alkenal. In the prior art there are described a number of reactions involving acid phosphate esters and alkanals; however, as pointed out above, these reaction products are condensation products where the alkanal serves to provide a linking nucleus between the reaction product of phosphorus pentasulfide and a reactant such as alkanol, thiol, phenol, etc., to form an alkylidene, bis (O,O-dialkyl dithiophosphate) type of compound. In these instances, the oxo group of the aldehyde is removed in the condensation reaction with the formation of water. It has been found that in carrying out the reaction in such a manner as to retain the oxo group of the aldehyde reactant in the dithiophosphate ester reaction product, unique properties are provided.

In order to effect this objective, an alkenal is reacted with an O,O-diester of a dithiophosphoric acid, this reaction being illustrated by the following equation:

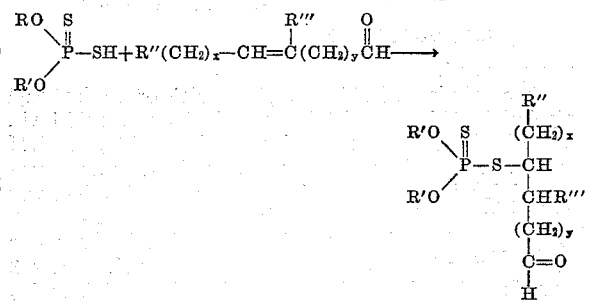

In carrying out the illustrated reaction, the reactants are brought together as a liquid phase mixture at a temperature in the range of 10–100° C. The reaction mixture preferably contains a saturated hydrocarbon solvent to aid in temperature control and the use of aromatic solvents insures the homogeneity of the reaction mixture. Aliphatic solvents or mineral oils may also be included in the reaction mixtures. The reactants may be combined by gradual addition of the unsaturated aldehyde to the O,O-diester of phosphorodithioic acid, or, in the case of volatile aldehydes, by distillation of the latter into the reaction mixture, or alternately by combining substantially equimolar amounts of reactants in a concurrent flow system. Suitable agitation of the reaction mixture is desirable, particularly when two liquid phases are present. The reaction can be carried out in the absence of added catalysts and in presence of an inert atmosphere obtained by purging the air from the system. It may be preferred, however, that a catalyst be employed. In this instance, peroxides, such as benzoyl peroxide and others can be used. The unsaturated aldehyde is used in amounts of 0.9 to 1.4 moles per mole of dialkyl (or aryl) phosphorodithioic acid. The extent of reaction may be followed by determination of the acidity of the reaction mixture which drops to a low value as free acid is converted to neutral ester.

The acid phosphate esters employed in the preparation of the substituted esters of this invention include esters prepared from phosphorus pentasulfide and aliphatic or aromatic hydroxy compounds. The hydroxy compounds include alcohols of the straight-chain, branched-chain or cyclic type, phenol, alkylphenols and naphthols and mixtures thereof. Hydroxy compounds of $C_2-$ to $C_{20}$ and preferably of $C_4$ to $C_{12}$ may be employed in the preparation of acid diesters of phosphorodithioic acid. Suitable hydroxy compounds useful in this step include n-amyl alcohol, mixed primary amyl alcohols, 2-ethylhexyl alcohol, lauryl alcohol, cyclohexanol, phenol, m-cresol and amylphenol. The aldehydes which are employed in the reaction with the above-mentioned acid thiophosphate esters are straight or branched-chain alkenals having the following structural formula:

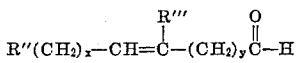

where $R''$ is selected from the group consisting of hydrogen and phenyl, $R'''$ is selected from the group consisting of hydrogen, methyl and ethyl, and $x$ and $y$ are integers from 0 to 8, inclusive. Examples of alkenals which can be employed in this invention include: acrolein, crotonaldehyde, 2-pentenal, 3-octenal, 5-decenal, 2-ethyl-2-hexenal, 10-hexadecenal, methacrolein and cinnamaldehyde. Although alkenals in general are effective in preparing the formyl thiophosphate esters of this invention, it is preferred that $\alpha,\beta$ unsaturated alkenals be selected. Because of their convenient availability, compounds such as acrolein and crotonaldehyde are especially applicable.

To further illustrate the subject invention a formylalkyl dialkyl phosphorodithioic ester having the following formula:

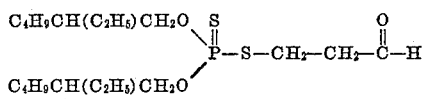

was prepared.

To a solution of 130 gm. (1.0 mole) of 2-ethylhexyl alcohol in 130 gm. of toluene and 130 gm. of 85 vis. neutral mineral lubricating oil was added 55.6 gm. (0.25 mole), of phosphorus pentasulfide, and the mixture was heated for four hours on the steam bath. Acrolein was gradually added to the resulting solution of di-2-ethylhexyl phosphorodithioic acid by distilling it through a tube dipping below the surface of the liquid. After 3 hours' reaction time at 15–30° C. with 36 gm. (0.65 mole) of acrolein, the acid number of the reaction mixture was found to be 6, representing more than 90% reduction of acidity of the phosphorodithioic acid. The reaction mixture was nitrogen-stripped at +10° C. and 20 mm. pressure to remove solvent and excess acrolein. The liquid product, an oil solution of formylethyl di-2-ethylhexyl phosphorodithioate, weighed 323 gm., 96%. The product showed a positive fuchsin-aldehyde test. From an analysis calculated for a 61.2% concentrate of $C_{19}H_{39}O_3PS_2$ in oil, the phosphorus content was 4.6% and the sulfur content 9.6%. Upon actual analysis of the above reaction product, the phosphorus content was found to be 4.6% and the sulfur content 9.5%. The analysis demonstrates that an aldehyde condensation reaction with the elimination of water, as has been reported for saturated aldehydes, did not take place with acrolein.

Although the thiophosphate esters of this invention have other uses, such as antioxidants and corrosion inhibitors for petroleum products, insecticides, and surface active agents, they are especially effective as lubricating oil additives for imparting antiwear and load-carrying characteristics to lubricating oils. To illustrate this characteristic, a lubricating oil composition was prepared by incorporating 2.2% by weight of the formylalkyl thiophosphate ester prepared in accordance with the foregoing example in a base oil having the following composition:

| Component: | Amount, w. percent |
|---|---|
| Mid-Continent solvent-refined 170 vis. neutral mineral oil | 94.0 |
| Basic barium petroleum sulfonate [1] | 5.3 |
| Corrosion inhibitor (sulfurized terpene) [2] | 0.65 |

[1] A proprietary lubricating oil additive having an ash content (as sulfate) of 19% and a total base number of 44.
[2] A proprietary lubricating oil additive marketed under the trademark Stan-Add 48 and consisting of a sulfurized terpene having a sulfur content of 29.4%.

The ability to carry increasing loads at ordinary oil temperatures was measured on the four ball E.P. testing machine. In this test, individual runs are made at 1800 r.p.m. and 10 seconds' duration with loads increasing in 10 kg. increments until a low wear rate is no longer maintained. The wear scar diameters are found to increase substantially at this transition point. The results of these tests are summarized in Table I in which various additives are compared at the same phosphorus concentration in the above-described base oil.

Table I

| Antiwear additive: | Transition to high wear rate, kg. |
|---|---|
| Formylethyl di - 2 - ethylhexyl phosphorodithioate | 120 |
| Zinc di-2-ethylhexyl phosphorodithioate | 90 |
| Carboxyethyl di - 2 - ethylhexyl phosphorodithioate, Ca salt | 80 |
| N-t-butyl carbamylethyl di - 2 - ethylhexyl phosphorodithioate | 90 |
| Carboxyethyl di - 2 - ethylhexyl phosphorodithioate, 2-ethylhexyl ester | 100 |
| None | 60 |

Similar results were obtained in a different lubricant formulation with antiwear additives prepared from a commercial zinc dialkyl phosphorodithioate. In this case, the following base oil composition was used:

| Component: | Amount, v. percent |
|---|---|
| Mid-Continent solvent-refined 170 vis. neutral oil | 84.2 |
| Mid-Continent solvent extract obtained in the manufacture of an 85 vis. solvent-refined neutral oil [1] | 4.5 |
| Calcium sulfonate-barium tert. octylphenol sulfide [2] | 5.0 |
| Polymeric ester of the acrylic acid series [3] | 6.3 |

[1] An extract fraction obtained in the solvent refining of a Mid-Continent oil with phenol and having the following characteristics:

| | Physical | Chemical |
|---|---|---|
| API Gravity | 16.9 | Aromatics, 76.8. |
| SUS Viscosity: | | Asphaltenes, Nil. |
| @ 100° F | 165.5 | |
| @ 130° F | 83.9 | Aniline Point, °F. 104.9. |
| @ 210° F | 41.1 | |

[2] A proprietary combination detergent for lubricating oils consisting of a barium tertiary octyl phenol sulfide having admixed therewith a calcium petroleum sulfonate.
[3] A high molecular weight polymeric ester (10,000–20,000) of methacrylic acid and higher fatty alcohols, e.g., lauryl, cetyl, and octyl, having a viscosity of 43,000 SUS at 100° F. and a viscosity of 3700 SUS at 210° F.

Table II shows the results of four-ball load-transition tests on lubricants containing the phosphorodithioic acid and the formylethyl dialkyl phosphorodithioate prepared from a commercial zinc dialkyl phosphorodithioate, at 0.10 w. percent phosphorus in the blends.

Table II

| Antiwear additive: | Transition to high wear rate, kg. |
|---|---|
| Formylethyl dialkyl phosphorodithioate | 100 |
| Zinc dialkyl phosphorodithioate | 90 |
| Dialkyl hydrogen phosphorodithioate | 60 |
| None | 50 |

From the foregoing data, it is seen that the formylalkyl thiophosphates of this invention are effective load-carrying agents. The important feature of these compositions is their ability to impart desirable characteristics to lubricating oil compositions without adversely affecting combustion chamber deposit-forming and surface-ignition tendencies. This latter characteristic of the additives of this invention, in contrast to other phosphate ester addends, is illustrated by surface-ignition counts attributed to combustion chamber deposits in a single cylinder engine. Deposits are laid down by burning small amounts of additive along with the fuel and later measuring the percentage of unfired cycles which contain surface-induced ignition. Comparative results are shown in Table III.

Table III

| Compound: | Surface ignition, percent |
|---|---|
| Formylethyl dialkyl phosphorodithioate | 27 |
| Zinc dialkyl phosphorodithioate | 34 |

In general, the most effective concentrations of the formylphosphate ester additive of this invention are within the range of 0.02–0.5 wt. percent as phosphorus in the final composition. For some applications, amounts outside this range can be employed, if desired, and amounts as low as 0.01% to as high as 1.0 wt. percent of phosphorus as the thiophospate ester of this invention are effective.

In the illustrative example, a Mid-Continent, solvent-refined, neutral lubricating oil was employed. To formulate lubricating oils employing the formylalkyl thiophosphate of this invention a variety of other oleaginous lubricating liquids can be used. These include mineral lubricating oil fractions derived from paraffinic, naphthenic, or mixed base crudes in the preparation of finished neutrals and bright stocks. In addition, synthetic lubricating oils, such as silicones, diesters, and other unctuous lubricating liquids well known in the prior art have application in carrying out this invention.

To supplement and complement the properties of the basic lubricant of this invention, which comprises a minor portion of the formylalkyl thiophosphate herein described and a major portion of an oleaginous liquid having lubricating properties, other functional additives such as pour point depressants, V.I. improvers, antioxidants, detergents, rust inhibitors and others can be used.

In view of the foregoing disclosure, additional uses and modified lubricating oil formulations will be obvious to those skilled in this art. It is not intended that the illustrative examples be a limiting factor; instead, this invention is limited only by the following claims. Accordingly, we claim:

1. A lubricating oil composition comprising a major amount of an oleaginous liquid from the group consisting of mineral oil, synthetic silicones and synthetic diesters, and a minor amount, sufficient to enhance the antiwear characteristics of said liquid, of a formyl triester of dithiophosphoric acid having the formula:

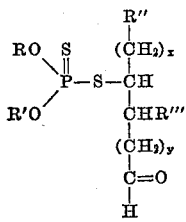

where R and R' are selected from the group consisting of saturated alkyl radicals having 2 to 20 carbon atoms, aryl and alkylaryl radicals containing from 1 to 16 carbon atoms in the saturated alkyl substituent group, R'' is selected from the group consisting of hydrogen and phenyl, R''' is a substituent selected from the group consisting of hydrogen, methyl, and ethyl, and $x$ and $y$ are integers from 0 to 8, inclusive.

2. A lubricating oil composition in accordance with claim 1 in which said formyl triester is prepared by reacting a diester of thiophosphoric acid with an alkenal having the formula:

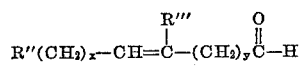

where R'' is selected from the group consisting of hydrogen and phenyl, R''' is selected from the group consisting of hydrogen, methyl and ethyl, and $x$ and $y$ are integers from 0 to 8, inclusive.

3. A lubricating oil composition in accordance with claim 1 in which the oleaginous liquid base consists of mineral lubricating oil.

4. A lubricating oil composition in accordance with claim 2 in which said formyl triester is present in an amount sufficient to provide a phosphorus content within the range of 0.01–1.0% by weight of the lubricating oil composition.

5. A lubricating oil composition in accordance with claim 3 in which the formyl triester is present in amount equivalent to 0.02–0.5% by weight of phosphorus based on the lubricating oil composition.

6. A lubricating oil composition in accordance with claim 4 in which said formyl triester is prepared by reacting a diester of dithiophosphoric acid with an $\alpha,\beta$ unsaturated alkenal.

7. A lubricating oil composition in accordance with claim 6 in which said alkenal is selected from the group consisting of acrolein, crotonaldehyde, and methacrolein.

References Cited in the file of this patent

UNITED STATES PATENTS

| 2,526,497 | Mikeska | Oct. 17, 1950 |
| 2,531,129 | Hook | Nov. 21, 1950 |
| 2,578,652 | Cassaday | Dec. 18, 1951 |
| 2,586,655 | Hook | Feb. 19, 1952 |
| 2,632,020 | Hoegberg | Mar. 17, 1953 |
| 2,794,041 | Norman et al. | May 28, 1957 |

OTHER REFERENCES

Chemical Abstracts, page 6639(g), 1954.

UNITED STATES PATENT OFFICE
CERTIFICATE OF CORRECTION

Patent No. 2,948,682                            August 9, 1960

Gifford W. Crosby et al.

It is hereby certified that error appears in the printed specification of the above numbered patent requiring correction and that the said Letters Patent should read as corrected below.

Column 2, lines 43 to 46, for that portion of the formula reading

column 3, line 25, for "R″" read -- R″ --; column 6, line 28, for "R″" read -- R‴ --.

Signed and sealed this 18th day of April 1961.

(SEAL)
Attest:

ERNEST W. SWIDER                           DAVID L. LADD
Attesting Officer                              Commissioner of Patents